Nov. 6, 1934.  A. B. BELGARD  1,979,855
SPECTACLES
Filed Sept. 3, 1932
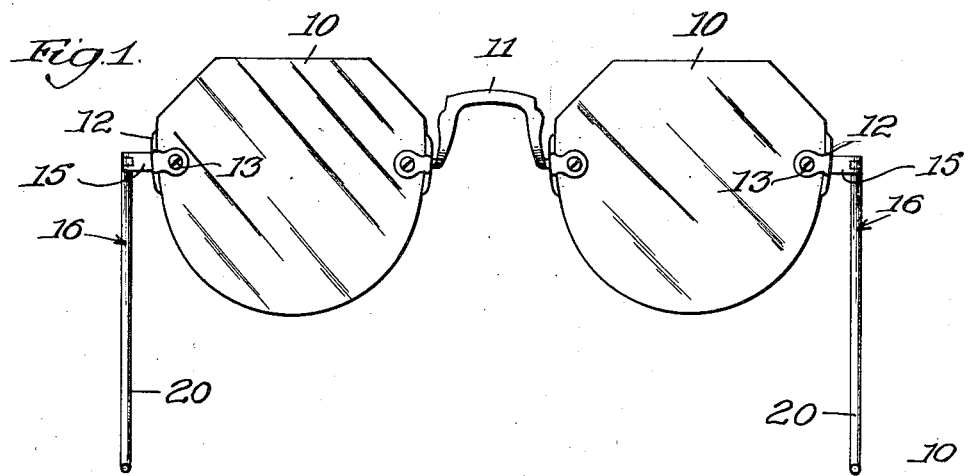
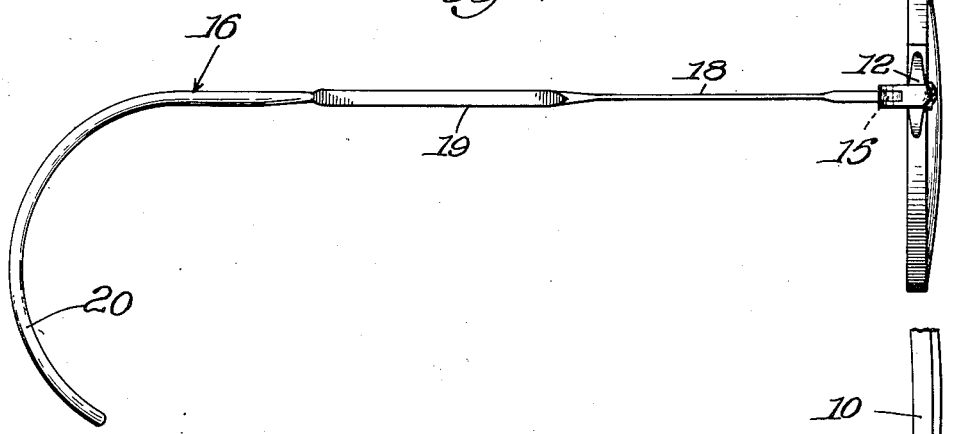
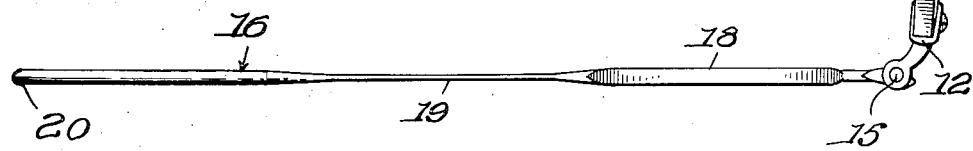

Patented Nov. 6, 1934

1,979,855

UNITED STATES PATENT OFFICE 1,979,855

SPECTACLES

Austin B. Belgard, Chicago, Ill., assignor to Belgard-Spero, Inc., a corporation of Delaware Application September 3, 1932, Serial No. 631,719

2 Claims. (Cl. 88—52)

The invention relates to spectacles and particularly to the temples or bows thereof.

One form of the invention is embodied in a pair of spectacles comprising temples or bows which are flattened into planes extending at angles to each other. Temples or bows embodying this construction will flex or bend readily when one is putting on the eyeglasses or replacing them and therefore prevents breakage of the temples or bows and prevents injury to the pivotal connections whereby the temples or bows are secured to the lenses.

Other objects and advantages will become apparent as the following detailed description progresses, reference being had to the accompanying drawing, wherein—

Figure 1 is a front elevation of a pair of spectacles which embody the invention.

Figure 2 is a side elevation of the improved spectacles, and

Figure 3 is a vertical plan view of the improved spectacles.

Referring to the drawing which illustrates a preferred embodiment of the invention, the reference character 10 designates the lenses of a pair of spectacles, the lenses being secured to each other by a bridge member 11 of any suitable construction. Secured to each lens 10 is an end piece 12 of any well known or preferred construction, the end pieces 12 being secured to the lenses 10, in this instance, by screws 13. A pin 15 pivots a bow or temple 16 to each of the end pieces 12.

As best shown in Figures 2 and 3, each of the bows or temples 16 is flattened as at 18 and 19. The flattened portion 18 is adjacent the pivoted end of the bow or temple and extends in a substantially horizontal plane. The flattened portion 19 is disposed intermediate the flattened portion 18 and the curved end 20 of the bow or temple. The portion 19 is preferably disposed at right angles to the portion 18. Each of the flattened portions is relatively long and relatively thin so that the bow or temple may be bent or flexed easily when one puts on the spectacles or removes them. As stated above, this construction insures that no appreciable strain will be placed upon the pivotal connections of the bows or temples and there will be no breakage of the temples or bows at these points. Likewise, the end pieces 12 will not be injured when the spectacles are put on or removed.

While I have shown and described certain embodiments of my invention, it is to be understood that it is capable of many modifications. Changes, therefore in the construction and arrangement may be made without departing from the spirit and scope of the invention as disclosed in the appended claims, in which it is my intention to claim all novelty inherent in my invention as broadly as possible, in view of the prior art.

I claim:

1. A temple equipped with means for securing its forward end to a lens and having substantially that portion of its length extending forwardly of the eye in the form of a resilient thin flat band lying in a horizontal plane, and having also a portion of its length extending rearwardly of the eye in the form of a thin flat band lying in a substantially vertical plane.

2. A temple equipped with means for securing its forward end to a lens and having substantially that portion of its length extending forwardly of the eye in the form of a thin flat band lying in a horizontal plane and adapted to yield in a vertical plane, said temple having that portion of its length extending rearwardly of the eye relatively unyielding in a vertical plane.

AUSTIN B. BELGARD.